US011604572B2

(12) United States Patent
Li et al.

(10) Patent No.: US 11,604,572 B2
(45) Date of Patent: Mar. 14, 2023

(54) MULTI-SCREEN INTERACTION METHOD AND APPARATUS, AND STORAGE MEDIUM

(71) Applicant: BEIJING XIAOMI MOBILE SOFTWARE CO., LTD., Beijing (CN)

(72) Inventors: Jiayi Li, Beijing (CN); Ming Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/934,904

(22) Filed: Jul. 21, 2020

(65) Prior Publication Data

US 2021/0263642 A1 Aug. 26, 2021

(30) Foreign Application Priority Data

Feb. 25, 2020 (CN) .......................... 202010117281.4

(51) Int. Cl.
*G06F 3/04845* (2022.01)
*H04M 1/72469* (2021.01)
*G06F 3/04817* (2022.01)
*G06F 3/14* (2006.01)

(52) U.S. Cl.
CPC ...... *G06F 3/04845* (2013.01); *G06F 3/04817* (2013.01); *G06F 3/1454* (2013.01); *H04M 1/72469* (2021.01)

(58) Field of Classification Search
CPC ............ G06F 3/04845; G06F 3/04817; G06F 3/1454; G06F 3/0486; G06F 3/0488; H04M 1/72469; H04M 1/72412; H04M 1/72409; G09G 2354/00; G09G 2370/04; G09G 2370/16; H04N 21/43076
See application file for complete search history.

(56) References Cited

U.S. PATENT DOCUMENTS

| 5,801,700 A | 9/1998 | Ferguson |
| 7,031,004 B1 | 4/2006 | Hayward |
| 2006/0080397 A1* | 4/2006 | Chene .................. H04L 69/329 709/213 |
| 2006/0083187 A1 | 4/2006 | Dekel |
| 2007/0157101 A1 | 7/2007 | Indiran |
| 2008/0016453 A1 | 1/2008 | Quillen |
| 2008/0100532 A1 | 5/2008 | Lee |

(Continued)

FOREIGN PATENT DOCUMENTS

| CN | 101834937 A | 9/2010 |
| CN | 102984393 A | 3/2013 |

(Continued)

OTHER PUBLICATIONS

First Office Action of the Chinese application No. 202010117281.4, dated Oct. 26, 2020.

(Continued)

*Primary Examiner* — Daniel W Parcher
(74) *Attorney, Agent, or Firm* — Syncoda LLC; Feng Ma

(57) ABSTRACT

A multi-screen interaction method includes: a first interface of a second terminal is projected on a display screen of a first terminal; detection is performed on a first operation acting on the first interface; and when the first operation on a first object in the first interface is detected, the first operation on the first object is responded in the first terminal.

14 Claims, 19 Drawing Sheets

(56) References Cited

U.S. PATENT DOCUMENTS

| | | | |
|---|---|---|---|
| 2008/0307367 A1 | 12/2008 | Garrison | |
| 2010/0005138 A1 | 1/2010 | Manzano | |
| 2010/0262666 A1* | 10/2010 | Kalu | G06Q 10/107 709/206 |
| 2010/0299728 A1 | 11/2010 | Haff | |
| 2011/0059769 A1* | 3/2011 | Brunolli | G08C 17/02 455/556.1 |
| 2011/0112819 A1* | 5/2011 | Shirai | G06F 9/45537 703/21 |
| 2012/0038541 A1* | 2/2012 | Song | G06F 3/1423 345/1.1 |
| 2012/0144347 A1* | 6/2012 | Jo | G06F 3/04817 715/863 |
| 2012/0219181 A1 | 8/2012 | Tseng | |
| 2012/0289290 A1 | 11/2012 | Chae | |
| 2012/0324365 A1* | 12/2012 | Momchilov | H04L 67/42 715/738 |
| 2013/0125009 A1* | 5/2013 | De | H04L 67/08 715/740 |
| 2013/0151981 A1* | 6/2013 | Green | G06F 3/0484 715/744 |
| 2013/0204945 A1 | 8/2013 | Li et al. | |
| 2013/0232437 A1 | 9/2013 | Kim | |
| 2013/0283177 A1 | 10/2013 | Seo et al. | |
| 2014/0016037 A1* | 1/2014 | Goldberg | G06F 9/452 348/600 |
| 2015/0020013 A1* | 1/2015 | Kim | G06F 3/1454 715/769 |
| 2015/0046837 A1 | 2/2015 | Chen | |
| 2017/0017454 A1* | 1/2017 | Kim | G06F 3/04845 |
| 2017/0168760 A1 | 6/2017 | Smith et al. | |
| 2018/0020490 A1 | 1/2018 | Chong et al. | |
| 2019/0222632 A1 | 7/2019 | He | |
| 2019/0324826 A1 | 10/2019 | Abuelata | |
| 2020/0333994 A1* | 10/2020 | Sepulveda | G06F 3/04817 |

FOREIGN PATENT DOCUMENTS

| | | | |
|---|---|---|---|
| CN | 103577089 A | | 2/2014 |
| CN | 103731186 A | | 4/2014 |
| CN | 104468741 A | | 3/2015 |
| CN | 106603823 A | | 4/2017 |
| CN | 107066172 A | | 8/2017 |
| CN | 109739450 A | | 5/2019 |
| CN | 109766066 A | | 5/2019 |
| CN | 110221798 A | | 9/2019 |
| CN | 110471639 A | | 11/2019 |
| CN | 110515576 A | | 11/2019 |
| CN | 110618970 A | | 12/2019 |
| CN | 110618971 A | | 12/2019 |
| CN | 110673782 A | | 1/2020 |
| EP | 1079299 A2 | | 2/2001 |
| EP | 2657830 A2 | | 10/2013 |
| JP | 2010092455 A | | 4/2010 |
| JP | 2012508929 A | | 4/2012 |
| JP | 2013025409 A | | 2/2013 |
| JP | 2014013567 A | | 1/2014 |
| KR | 20090039601 A | | 4/2009 |
| KR | 20130012225 A | | 2/2013 |
| KR | 20150145174 A | | 12/2015 |
| RU | 2010147632 A | | 5/2012 |
| WO | 2018196621 A1 | | 11/2018 |

OTHER PUBLICATIONS

European Search Report in the European application No. 20188582. 9, dated Dec. 23, 2020.
First Office Action of the Chinese application No. 201910419550.X, dated Apr. 8, 2021.
First Office Action of the Korean application No. 10-2019-7033847, dated Apr. 30, 2021.
International Search Report in the international application No. PCT/CN2019/110484, dated Feb. 6, 2020.
First Office Action of the U.S. Appl. No. 16/689,598, dated Feb. 4, 2021.
European Search Report in the European application No. 19212484. 0, dated May 28, 2020.
Final Office Action of the U.S. Appl. No. 16/689,598, dated Jul. 26, 2021.
First Office Action of the Japanese application No. 2019-562562, dated Sep. 15, 2021.
Written Opinion of the International Search Authority in the international application No. PCT/CN2019/110484, dated Feb. 6, 2020.
First Office Action after RCE of the U.S. Appl. No. 16/689,598, dated Dec. 24, 2021.
Advisory Action of the U.S. Appl. No. 16/689,598, dated Oct. 18, 2021.

* cited by examiner

MULTI-SCREEN INTERACTION METHOD AND APPARATUS, AND STORAGE MEDIUM

CROSS-REFERENCE TO RELATED APPLICATION

This application claims priority to Chinese Patent Application No. 202010117281.4 filed on Feb. 25, 2020, the disclosure of which is hereby incorporated by reference in its entirety.

BACKGROUND

With the development of cross-device connections, information transmissions between mobile phones and computers have been widely valued in the industry. The functions such as airdrop and Handoff developed by APPLE™ and the products such as nearby sharing developed by MICROSOFT™ all establish a technical basis for the connection between mobile phones and computers of users. On the basis of these technologies, mobile phones and computers have more possibilities for interactions.

SUMMARY

The present disclosure relates generally to the technical field of electronic devices, and more specifically to a multi-screen interaction method and apparatus, and a storage medium.

According to a first aspect of these embodiments of the present disclosure, a multi-screen interaction method applied to a first terminal is provided, which may include that:

a first interface of a second terminal is projected on a display screen of the first terminal;

detection is performed on a first operation acting on the first interface; and

In response to the first operation on a first object in the first interface being detected, the first operation on the first object is responded in the first terminal.

According to a second aspect of these embodiments of the present disclosure, a multi-screen interaction method applied to a second terminal is provided, which may include that:

a first interface is projected to a display screen of a first terminal; and a first operation detected by the first terminal on a first object in the first interface is responded.

According to a third aspect of these embodiments of the present disclosure, a multi-screen interaction apparatus applied to a first terminal is provided, which may include a processor and a memory configured to store instructions executable by the processor. The processor may be configured to:

project a first interface of a second terminal on a display screen of the first terminal;

detect a first operation acting on the first interface; and respond to, in response to the first operation on a first object in the first interface being detected, the first operation on the first object in the first terminal.

According to a fourth aspect of these embodiments of the present disclosure, a multi-screen interaction apparatus applied to a second terminal is provided, which may include a processor and a memory configured to store instructions executable by the processor. The processor may be configured to:

project a first interface to a display screen of a first terminal; and respond to a first operation detected by the first terminal on a first object in the first interface.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
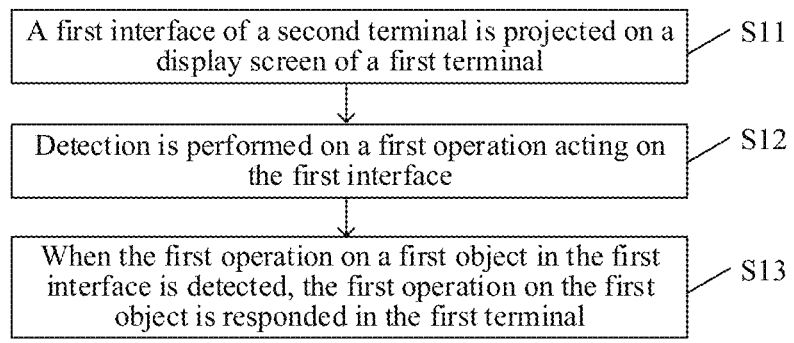
FIG. 1 is a first flowchart showing a multi-screen interaction method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Terms used in the present disclosure are only adopted for the purpose of describing specific embodiments but not intended to limit the present disclosure. "A/an" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that "first," "second" and similar terms used in the specification and claims of the present application are not to represent any sequence, number or importance but only to distinguish different parts. Likewise, similar terms such as "one" or "a/an" also do not represent a number limit but represent "at least one." Unless otherwise pointed out, terms like "front," "rear," "lower" and/or "upper" are only for convenient description but not limited to a position or a spatial orientation. Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

FIG. 1 is a first flowchart showing a multi-screen interaction method according to some embodiments of the present disclosure. As shown in FIG. 1, a multi-screen interaction method applied to a first terminal includes the following operations.

In S11, a first interface of a second terminal is projected on a display screen of the first terminal.

In S12, detection is performed on a first operation acting on the first interface.

In S13, in response to the first operation on the first object in the first interface being detected, the first operation on the first object is responded in the first terminal.

In these embodiments of the present disclosure, the first terminal may be a notebook computer, a tablet computer, a television terminal, or the like.

In some embodiments, the first terminal may be a terminal device with a screen larger than that of the second terminal. For example, when the first terminal is a personal computer (PC), the second terminal may be a mobile phone or a tablet computer. In some other embodiments, when the first terminal is a tablet computer or a tablet/PC two-in-one computer, the second terminal may be a mobile phone or a wearable device.

In these embodiments of the present disclosure, a wired connection may be established between the first terminal and the second terminal. The wired connection may include but is not limited to a universal serial bus (USB) connection or a serial port connection. In addition, a wireless connection may also be performed between the first terminal and the second terminal. For example, a wireless connection may be established through Bluetooth communication or near field communication (NFC). The wireless connection may also include a device to device (D2D) wireless connection, a wireless fidelity (Wi-Fi) direct connection, and the like.

For the wireless connection, In some embodiments:

the first terminal may send first broadcast information, and the first broadcast information may carry user account information of the first terminal;

a first connection request fed back by the second terminal based on the user account information may be received; and a connection with the second terminal may be established according to the first connection request.

In this connection mode, the first broadcast information sent by the first terminal may carry user account information of the first terminal, and the user account information may include, for example, an account name of a user. After receiving the first broadcast information, the second terminal in the same local area network may display the user account information included in the first broadcast information on a display screen of the second terminal. The second terminal may receive a connection confirmation instruction sent by the user based on the user account information and send a first connection request to the first terminal. The first terminal may establish a connection with the second terminal according to the first connection request.

Figure 2:
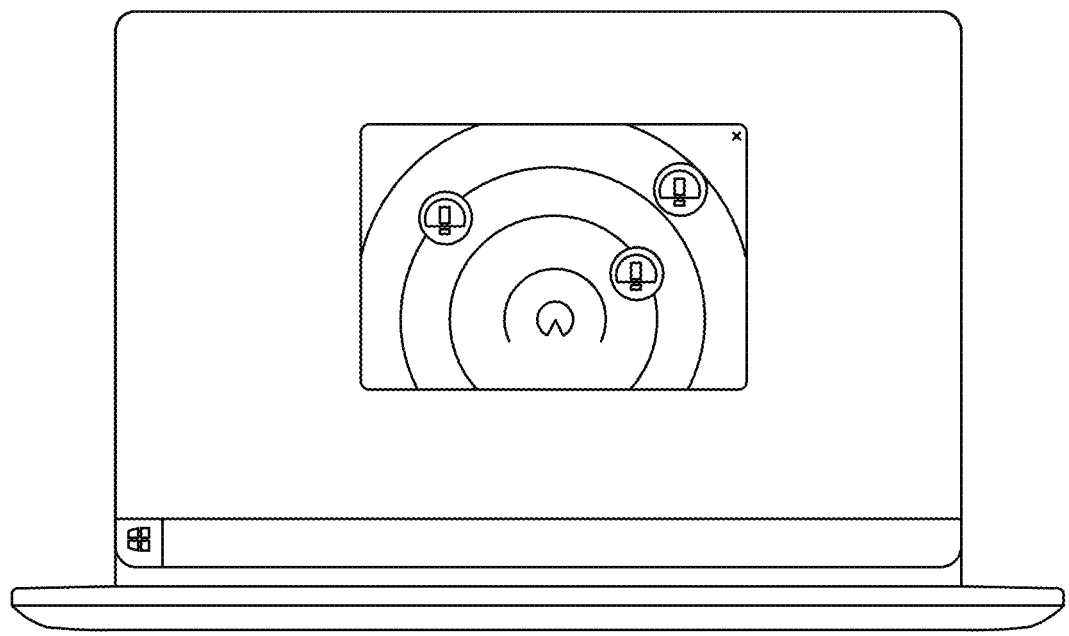
FIG. 2 is a schematic diagram of establishing a connection between a first terminal and a second terminal by sending and receiving broadcast information according to some embodiments of the present disclosure.
Figure 3:
FIG. 3 is a schematic diagram of establishing a connection between a first terminal and a second terminal by sending and receiving broadcast information according to some embodiments of the present disclosure.

FIG. 2 and FIG. 3 are schematic diagrams of establishing a connection between a first terminal and a second terminal by sending and receiving broadcast information according to some embodiments of the present disclosure. As shown in FIG. 2, after a notebook computer sends broadcast information carrying its own user identification information, multiple nearby terminals that receive the broadcast information may be displayed. As shown in FIG. 3, the second terminal may display connection prompt information including user identification information of a first terminal device. After detecting a user confirmation feedback to the connection prompt information, the second terminal may establish a connection with the first terminal. For example, the second terminal may establish a connection with the first terminal after a user clicks on a "connection" control.

In this connection mode, the first terminal may broadcast a connection signal to establish a direct connection between the first terminal and the second terminal without need of transit through a router, thus reducing information leakage caused by the router transit, and improving the safety of interaction between the first terminal and the second terminal.

For the wireless connection, in some embodiments:

a QR code including login link information is displayed on a display screen of the first terminal;

a second connection request fed back by the second terminal based on the QR code is received; and a connection with the second terminal is established according to the second connection request.

In this connection mode, the login link information may include device identification information of the first terminal. The second terminal may scan the QR code to parse and obtain the device identification information of the first terminal, and send a second connection request to the first terminal based on the device identification information. The first terminal may establish a connection with the second terminal based on the second connection request. The device identification information may be, for example, a physical address (media access control (MAC) address) of the device.

Figure 4:
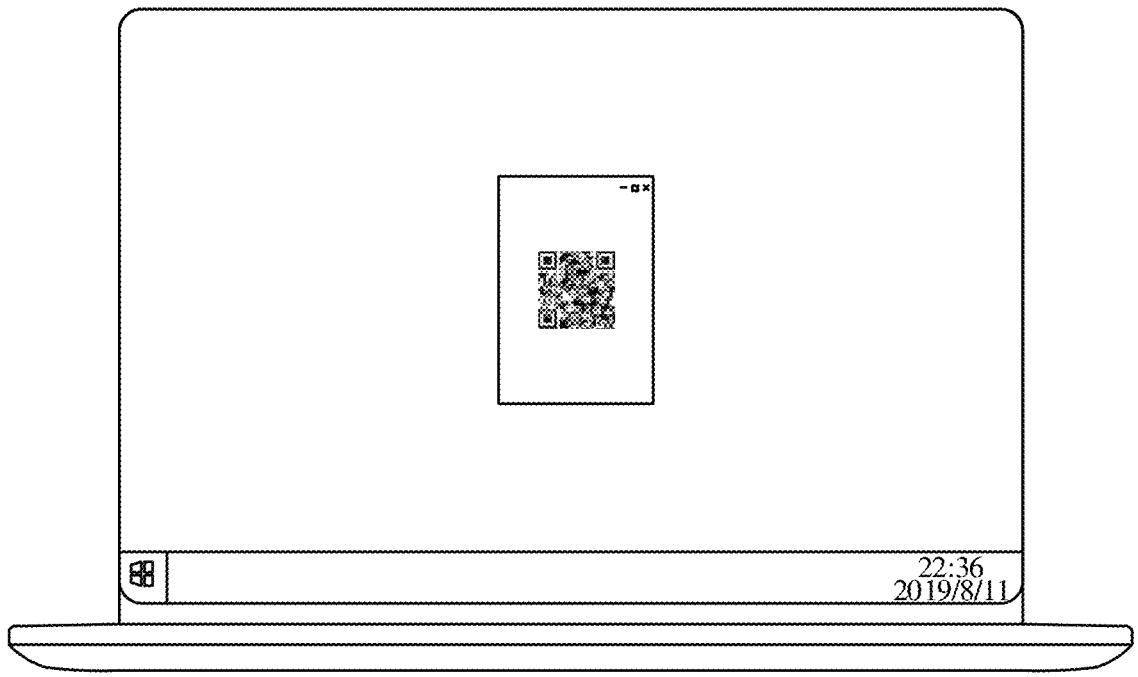
FIG. 4 is an example diagram of establishing a connection by code-scanning login according to some embodiments of the present disclosure.
Figure 5:
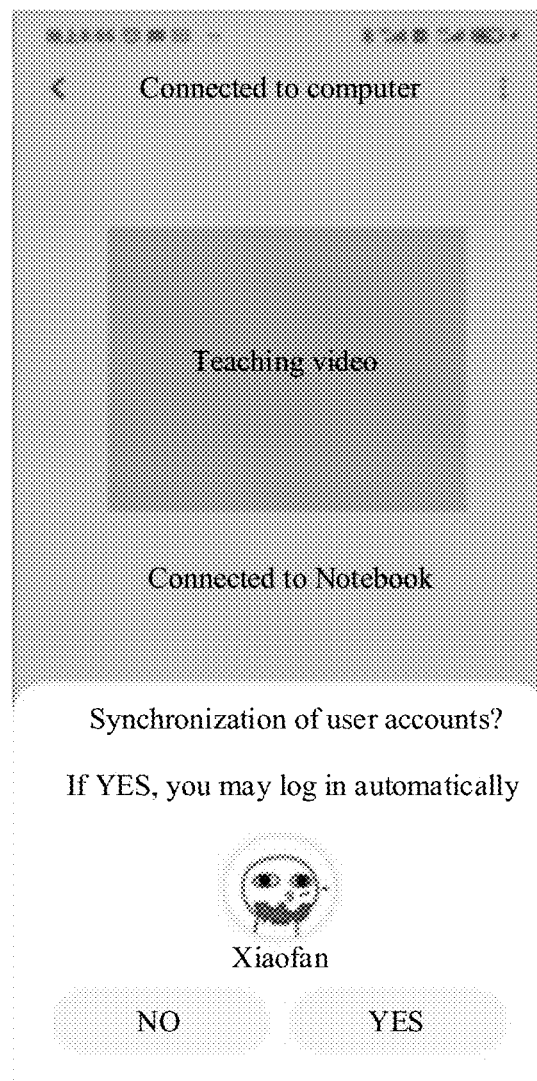
FIG. 5 is an example diagram of establishing a connection by code-scanning login according to some embodiments of the present disclosure.

FIG. 4 and FIG. 5 are example diagrams of establishing a connection by code-scanning login according to some embodiments of the present disclosure. As shown in FIG. 4, a desktop of the first terminal (notebook computer) displays QR code information for establishing a connection. As shown in FIG. 5, the second terminal (mobile phone) establishes a connection with the first terminal after scanning a code based on, for example, a code-scanning function in a camera, and displays a prompt message that the connection is successful on a display interface of the mobile phone.

It is to be noted that in these embodiments of the present disclosure, after the connection is established by code-scanning login for the first time, the second terminal may also upload its own user account information to the first terminal, so that the first terminal may save the user account information. The user account information may include an account name of a user, and may also include a password that matches the account name of the user. Generally, when the second terminal and the first terminal belong to the same user, the second terminal may upload user account information to the first terminal based on the user's permission.

As shown in FIG. 5, the display interface of the mobile phone displays prompt information indicating whether to synchronize a user account (user account information) to a computer device. Based on a synchronous confirmation operation of a user, the mobile phone may send the user account to a notebook computer.

When the connection is subsequently established, the first terminal may send second broadcast information. The second broadcast information may carry the MAC address of the first terminal and stored user account information of the second terminal. When the second terminal that receives the second broadcast information determines that the user account information carried in the second broadcast information is consistent with its own user account information, a connection with the first terminal can be established automatically through the MAC address of the first terminal in the second broadcast information. It can be understood that automatic connection establishment based on user account information brings convenience to the screen projection of the first terminal and the second terminal, and a user is not required to manually operate during each screen projection to achieve the connection, thereby improving the use experience.

Based on the connection established with the second terminal, the first terminal may project a first interface of the second terminal on the display screen based on operation S11. It is to be noted that the first interface of the second terminal may be a desktop of the first terminal, a setting interface of the second terminal, or an application interface of an application presently being displayed by the second terminal, which is not limited in these embodiments of the present disclosure. In addition, the layout of the first interface displayed on the display screen of the first terminal may be consistent with the layout in the second terminal.

In some embodiments, the size of the first interface displayed on the display screen of the first terminal may be the same as the size of the second terminal. In some other embodiments, the size of the first interface displayed on the display screen of the first terminal may be scaled appropriately according to the size of the display screen of the first terminal, but the aspect ratio consistent with the display screen of the second terminal may be maintained to reduce the strangeness of a user caused by the change in proportion, thereby improving the use experience.

The first terminal may detect a first operation acting on the first interface in operation S12 based on the displayed first interface of the second terminal. When the second terminal is a device that may be connected to a mouse and a keyboard, such as a notebook computer, the first operation may be a mouse-based click operation or a keyboard-based input operation, or the first operation may also be a voice-based voice control operation, which is not limited in these embodiments of the present disclosure.

In S13, when the first terminal detects the first operation on a first object in the first interface, the first operation on the first object is responded in the first terminal, that is, the second terminal can be controlled in the first terminal.

In these embodiments, the first object may be an icon of an application program on the desktop, a file in an application interface, or a control in a setting interface, which is not limited in these embodiments of the present disclosure.

It can be understood that in these embodiments, a first terminal can receive the sharing of a second terminal, and the second terminal can be controlled. An interactive user operation between the first terminal and the second terminal is simplified, and it is favorable for selecting the first terminal and/or the second terminal which are/is more suitable for a present application scenario based on an operation input by a user to perform corresponding operations, thereby improving the user experience and improving the intelligence of multi-screen interaction. In addition, for example, the first terminal is a computer, and the second terminal is a mobile phone. The shared content may be displayed on a display screen of the computer. Since the display screen is larger than the mobile phone, the visual experience of a user can be improved. In addition, the user-based first operation may be responded in the computer, and the hardware processing capacity in the computer is typically better than that of the mobile phone. Therefore, the response speed of the first operation can be increased, thereby improving the use experience.

In some embodiments, operation S13 includes that:

In response to the first operation of dragging the first object in the first interface out of the first interface being detected, the first object is stored in the first terminal.

In these embodiments, for example, the first interface may be an interface of an audio file list in a mobile phone or a smart speaker with a display screen, and the first object may be one of audio files. For another example, the first interface may be an interface of a picture file list in the mobile phone, and the first object may be an image file.

In these embodiments of the present disclosure, when the first terminal detects the first operation of dragging the first object in the first interface out of the first interface, the second terminal may send the first object to the first terminal, so that the first terminal can store the first object locally. For example, the first operation may be click dragging based on a mouse connected to a computer, or touch dragging of a user on a tablet computer.

Figure 6:
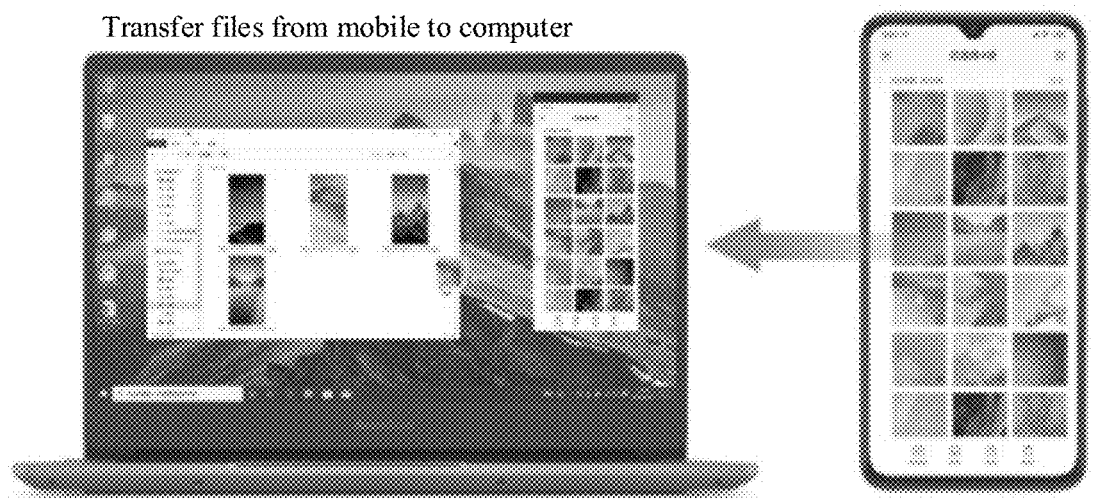
FIG. 6 is a first example diagram of a screen projection application according to some embodiments of the present disclosure.

FIG. 6 is a first example diagram of a screen projection application according to some embodiments of the present disclosure. As shown in FIG. 6, the first operation refers to that a mobile phone sends a dragged picture to a notebook computer when a picture in a picture list interface of the mobile phone is dragged to a picture list interface (that is, out of the first interface) of a notebook computer using a mouse, and the dragged picture is displayed in the picture list interface of the notebook computer.

It can be understood that in these embodiments, the first terminal may store the first object locally by detecting the first operation of dragging the first object in the first interface out of the first interface, thereby realizing the function of transmitting files from the second terminal to the first terminal. The file transmission function can be completed only by the first terminal detecting the first operation on the display screen of the first terminal, which reduces the number of terminals operated by a user and the number of operations of the user. Moreover, the operation is a simple dragging operation without an additional memory operation of the user, so it has the characteristics of a friendly interaction.

In some embodiments, the display screen may further include one or more second objects displayed outside the first interface.

The screen projection method applied to a first terminal may further include that:

detection is performed on a second operation acting on a region outside the first interface; and in response to the second operation of dragging the second object into the first interface being detected, the second object is sent to the second terminal.

In these embodiments of the present disclosure, a second object may also be displayed on the display screen of the first terminal. For example, the second object may be a document file on the desktop of the first terminal, or may be a picture file in an image list interface. When the first terminal detects the second operation of dragging the second object into the first interface, the first terminal may send the second object to the second terminal, so that the second terminal can store the second object.

Figure 7:
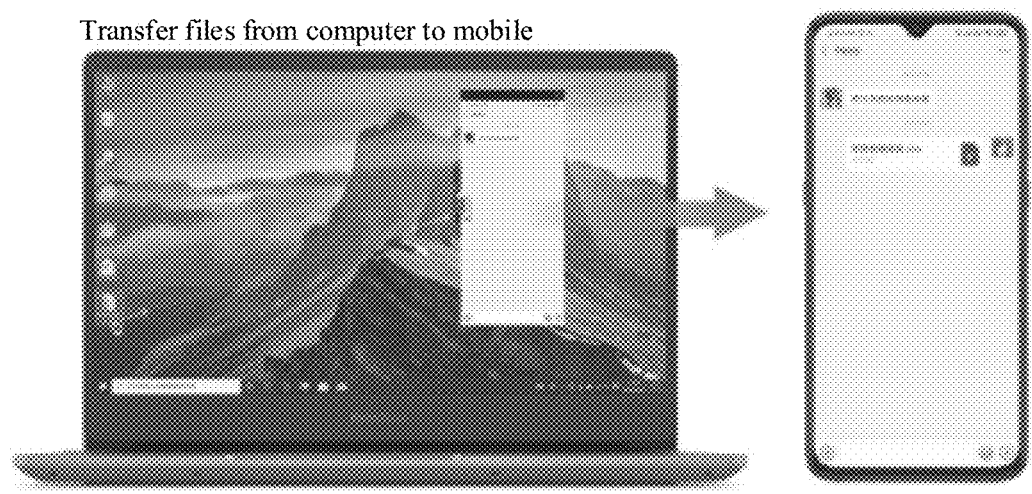
FIG. 7 is a second example diagram of a screen projection application according to some embodiments of the present disclosure.

FIG. 7 is a second example diagram of a screen projection application according to some embodiments of the present disclosure. The second operation is that when a document on the desktop of the notebook computer is dragged to a WECHAT™ chat interface (that is, in the first interface) of the mobile phone in the notebook computer, the notebook computer may send the dragged document to the mobile phone, so that the user of the mobile phone can send the document through the WECHAT™ chat interface. It is to be noted that the document can only be sent after it is saved in the mobile phone.

It can be understood that in these embodiments, when the first terminal detects the second operation of dragging the second object outside the first interface into the first interface, the second terminal may send the second object, so that the second object can be saved for use, thereby realizing the function of transmitting files from the first terminal to the second terminal.

In these embodiments of the present disclosure, based on a mutual file transmission function as provided, the intelligence of a screen projection application is further improved, and the use experience is improved.

In some embodiments, the first object may be a file or a program. Operation S13 may include that:

in response to the first operation of opening the first object in the first interface being detected, the first object is opened in the first terminal.

In these embodiments, the first object may be, for example, a word document, a music file or a picture file, or the like, or a music application program in the second terminal. When the first object is a file or a program, the first operation may be an opening operation on the file or the program, namely, the first object can be opened directly in the first terminal.

It is to be noted that in these embodiments of the present disclosure, when the first object is a file and when the first terminal detects an opening operation on the file, the file sent by the second terminal may be received and opened using a tool in the first terminal. For example, the first object may be a word document, and the first terminal may use its own Microsoft office Word tool to open the document. When a corresponding tool is not installed in the first terminal to open the file, the first terminal may automatically download and install the corresponding tool to open the file.

When the first object is a program and when the first terminal detects an opening operation on the program, it can be determined in advance whether the program of the same version as that of the second terminal is installed in the first terminal. When installed, the program installed in the first terminal may be directly opened. For example, the first terminal may be a PC, the second terminal may be a tablet computer, and the program may be a game program. When the program of the same version as that of the second terminal is not installed in the first terminal, the first terminal also can automatically download and install the program and then open the program.

It can be understood that in these embodiments, on one hand, since a user pays more attention to the first terminal when projecting the first interface of the second terminal to the first terminal, there is no need for the user to open a file or a program using the second terminal, thereby providing convenience to the user. On the other hand, since the display screen of the first terminal may be larger than that of the second terminal, the visual experience of the user can be improved. In addition, the hardware processing capacity of the first terminal is better than that of the second terminal. Therefore, the response speed of the first operation can be increased, thereby improving the use experience. Moreover, in these embodiments, when a tool capable of opening a file or a program is not installed in the first terminal, the file or the program may be automatically installed and opened, which has the characteristics of intelligence.

It is to be noted that in these embodiments of the present disclosure, when the first object is opened in the first terminal, the first object may not need to be opened in the second terminal synchronously, thereby saving the power consumption of the second terminal.

In some embodiments, the first object may be a file. The operation of responding to, in response to the first operation on the first object in the first interface being detected, the first operation on the first object in the first terminal may include that:

in response to the first operation of editing the file being detected, the file is opened in the first terminal, and the file is edited; and the edited file is sent to the second terminal.

In these embodiments, when the first terminal detects the first operation of editing the file, for example, the first terminal detects a modification operation on a word document, or a modification of a Microsoft Office PowerPoint (PPT) file or a modification of a picture file, the first terminal may use a tool to open the file and perform the editing operation. For example, for a picture file, the Photoshop tool may be used to perform the image editing operation. After finishing editing the file, the first terminal may automatically send the edited file to the second terminal.

Figure 8:
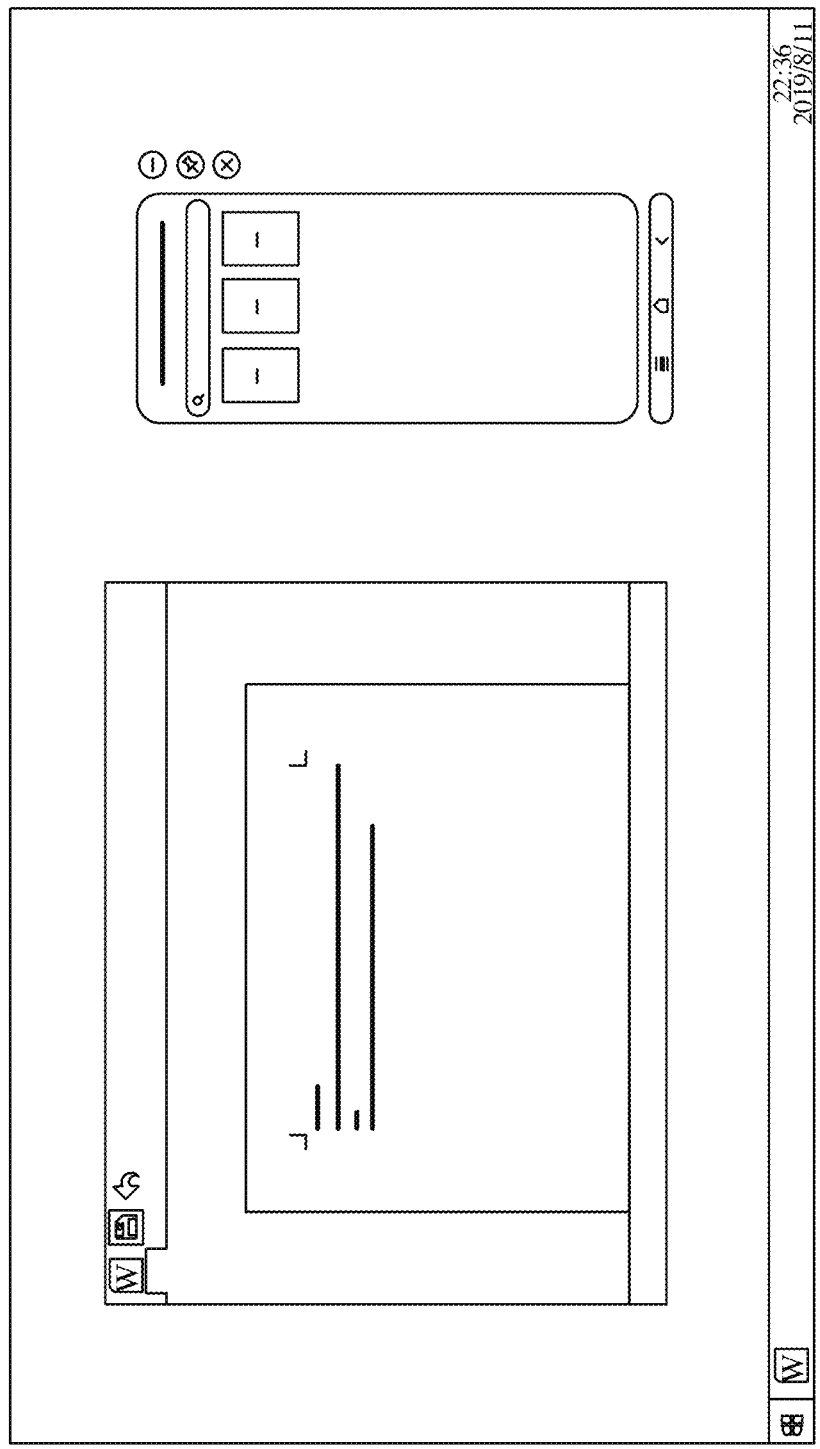
FIG. 8 is a third example diagram of a screen projection application according to some embodiments of the present disclosure.

FIG. 8 is a third example diagram of a screen projection application according to some embodiments of the present disclosure. As shown in FIG. 8, the notebook computer may open a word document in a file list interface from the mobile phone on the display screen of the notebook computer, and make edition in the word document.

It can be understood that in these embodiments, the first terminal can not only open the file in the second terminal, but also use its own tools to edit the file, which not only provides convenience to a user, but also enhances the visual experience of the user. The hardware processing capability of the first terminal may be further utilized to increase the response speed of the file editing operation, thereby improving the use experience. In addition, after the first terminal edits the file, there is no need to receive a dragging operation of the user and send the file to the second terminal based on a file dragging operation, but rather the edited file is automatically shared, and the convenience of file return is improved.

In some embodiments, the first object is a link address. Operation S13 may include that:

in response to the first operation acting on the link address in the first interface being detected, the first terminal opens a page connected to the link address according to the link address.

In these embodiments, when the first object is a link address, the link address may be a web address in a WeChat dialog interface, or a web address associated with news title information in a news interface. When the first terminal detects the first operation acting on the link address, such as a click operation, the first terminal may open a page connected to the link address.

Figure 9:
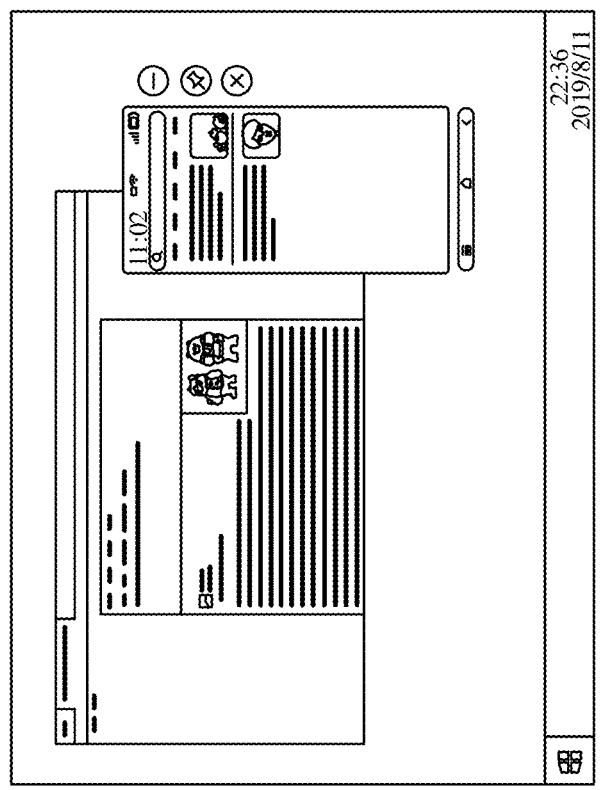
FIG. 9 is a fourth example diagram of a screen projection application according to some embodiments of the present disclosure.
Figure 9:
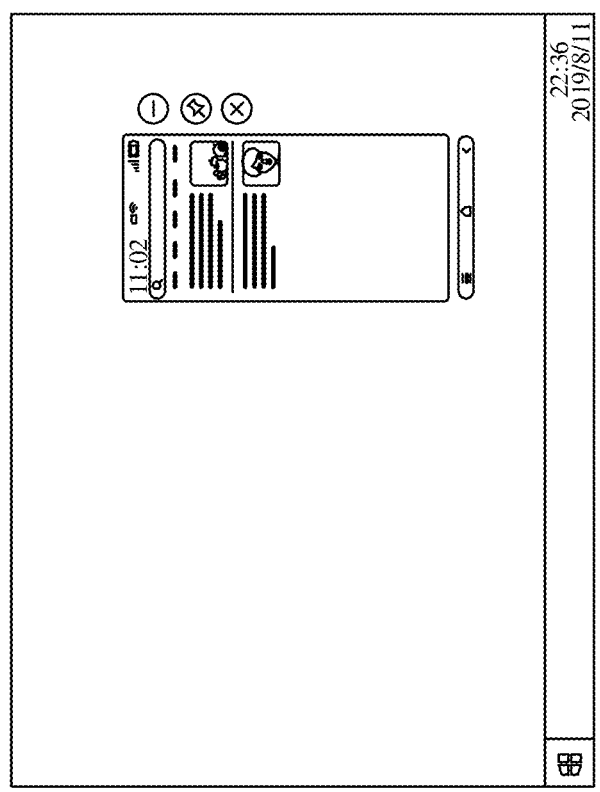

FIG. 9 is a fourth example diagram of a screen projection application according to some embodiments of the present disclosure. As shown in FIG. 9, when the notebook detects a click operation of a mouse on a second news title in the projected news interface, a page connected to the news title may be opened by a browser of the notebook.

It can be understood that in these embodiments, the first terminal is used to open the page connected to the link address, which can not only improve the visual experience of a user, but also further increase the page opening speed, thereby improving the user experience.

In some embodiments, the first object may include an interface added control. Operation S13 may include that:

in response to the first operation acting on the interface added control being detected, a second interface of the second terminal is projected on the display screen of the first terminal.

In these embodiments, the first interface may further include an interface control. The interface control may include an interface added control, and may further include an interface close control and the like. The interface control may be hidden from the display screen of the first terminal, and displayed on the display screen based on the user's operation detected by the first terminal. For example, when the first terminal detects a sliding operation of the mouse near a first interface region, the interface control may be displayed. Further, when the first terminal detects the first operation acting on the interface added control, a second interface of the second terminal may be projected on the display screen of the first terminal. The first operation may be, for example, a click operation on the interface added control. It is to be noted that the second interface may also be any interface of the second terminal, for example, a desktop of the second terminal, a Hiboard desktop, or a setting interface.

Figure 10:
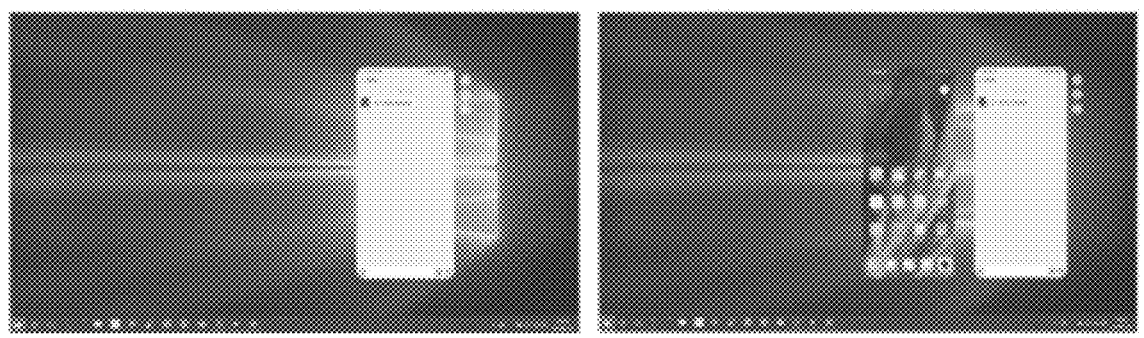
FIG. 10 is a fifth example diagram of a screen projection application according to some embodiments of the present disclosure.

FIG. 10 is a fifth example diagram of a screen projection application according to some embodiments of the present disclosure. As shown in FIG. 10, the first interface may be a WeChat chat interface, which also includes some controls on the right side of the chat interface. For example, the first control on the top right that is displayed as "+" is the interface added control. When the notebook computer detects the click operation of the mouse on the interface added control, the desktop of the mobile phone may be projected.

It can be understood that in these embodiments, when the first terminal detects the first operation acting on the interface added control, a second interface of the second terminal may be projected on the display screen of the first terminal, so that the first terminal may receive multiple shared tasks of the second terminal, which further provides convenience for the first terminal to operate multiple tasks in the second terminal.

In some embodiments, the second interface may include a desktop of the second terminal. The method may further include that:

in response to a third operation of dragging an icon of a target application on the desktop out of the desktop being detected, a third interface of the target application may be projected on the display screen of the first terminal.

In these embodiments, the second interface may be a desktop of the second terminal. When the first terminal detects a third operation of dragging an icon of a target application on the desktop out of the desktop, a third interface of the target application may be projected on the display screen of the first terminal. For example, when the target application is a WeChat application, the third interface may be a chat interface of a WeChat application. For another example, when the target application is a video application, the third interface may be a home page of the video application.

Figure 11:
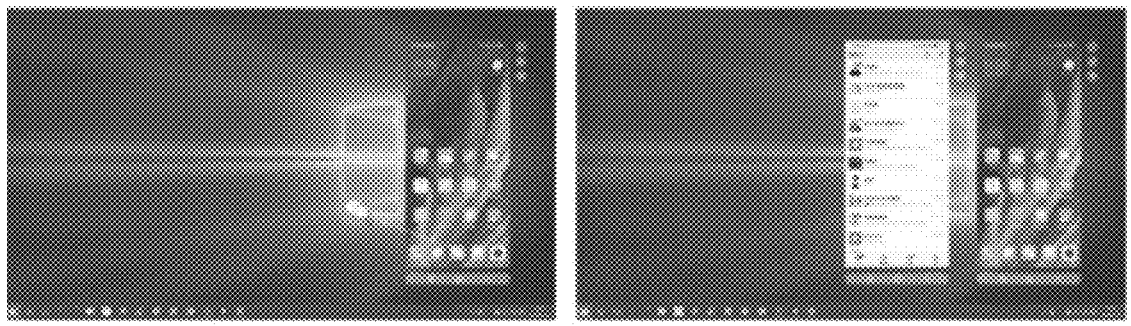
FIG. 11 is a sixth example diagram of a screen projection application according to some embodiments of the present disclosure.

FIG. 11 is a sixth example diagram of a screen projection application according to some embodiments of the present disclosure. As shown in FIG. 11, the second interface may be the desktop of a mobile phone. When a notebook computer detects a third operation of dragging an icon of a WeChat application projected to the display screen from the desktop of the mobile phone to a region outside the desktop of the mobile phone, a chat interface of the WeChat application may be projected on the display screen of the notebook computer.

It can be understood that in these embodiments, when the first terminal detects a third operation of dragging an icon of a target application on the desktop to a region outside the desktop, a third interface of the target application may be projected on the display screen of the first terminal. In this way, when the user needs to open a new application during the screen projection process, there is no need to open the target application in the second terminal and then project the interface to the first terminal, but an icon of the target application can be directly dragged in the first terminal. It has the characteristics of intelligence.

It is to be noted that in these embodiments of the present disclosure, when multiple interfaces of the second terminal are displayed on the display screen of the first terminal, operations on any interface may be responded in the first terminal. For example, the display screen of the first terminal may display a picture based on a click operation on a picture in a picture list interface (first interface) of the second terminal, or may display a message received in a WeChat chat interface (third interface) on the display screen of the first terminal.

In some embodiments, the method may further include that:

in response to the first operation of dragging the first object from the first interface to the third interface being detected, a first object copying instruction is sent to the second terminal, the first object copying instruction being configured to instruct the second terminal to copy the first object from the first interface to the third interface; and in response to a fourth operation of dragging a third object from the third interface to the first interface being detected, a third object copying instruction is sent to the second terminal, the third object copying instruction being configured to instruct the second terminal to copy the third object from the third interface to the first interface.

In these embodiments, different interfaces may interact based on an interaction operation detected by the first terminal. When the first terminal detects the first operation of dragging a first object from the first interface to the third interface, a first object copying instruction may be sent to the second terminal, so that the second terminal may copy the first object from the first interface to the third interface according to the first object copying instruction. When the first terminal detects the fourth operation of dragging a third object from the third interface to the first interface, a third object copying instruction may be sent to the second terminal, so that the second terminal may copy the third object from the third interface to the first interface according to the third object copying instruction.

Figure 12:
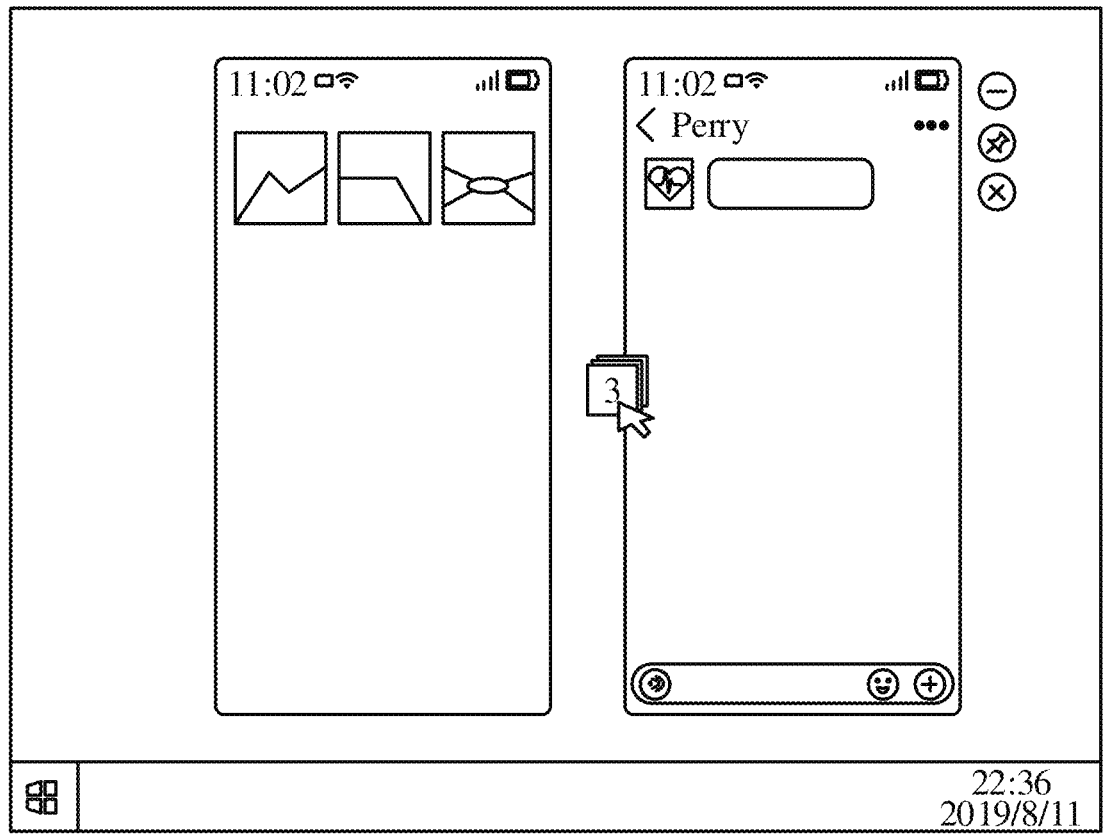
FIG. 12 is a seventh example diagram of a screen projection application according to some embodiments of the present disclosure.

FIG. 12 is a seventh example diagram of a screen projection application according to some embodiments of the present disclosure. As shown in FIG. 12, the first interface displayed on the display screen of the notebook computer may be a picture list interface in the mobile phone, and the third interface may be a WeChat chat interface in the mobile phone. When the notebook computer detects that a picture in the picture list interface is dragged to the WeChat chat interface, the dragged picture may be copied to the WeChat chat interface.

It can be understood that in these embodiments, the first terminal may control the information interaction between different interfaces, so that the screen projection application of the first terminal is more intelligent, a user does not need to operate on the second terminal when there is an additional information copying need while paying more attention to the first terminal.

In some embodiments, the first interface may include a message prompt interface, and the interface added control may include a message display control.

The operation of projecting, in response to the first operation acting on the interface added control being detected, a second interface of the second terminal on the display screen of the first terminal may include that:

in response to the first operation acting on the message display control in the message prompt interface being detected, a message display interface of the second terminal is projected on the display screen of the first terminal.

In these embodiments, the first interface projected on the first terminal may be a message prompt interface of the second terminal, and there may be a message display control on the message prompt interface. When the first terminal detects the first operation acting on the message display control, for example, a click operation on the message display control detected by the first terminal, the message display interface of the second terminal may be projected on the display screen of the first terminal.

Figure 13:
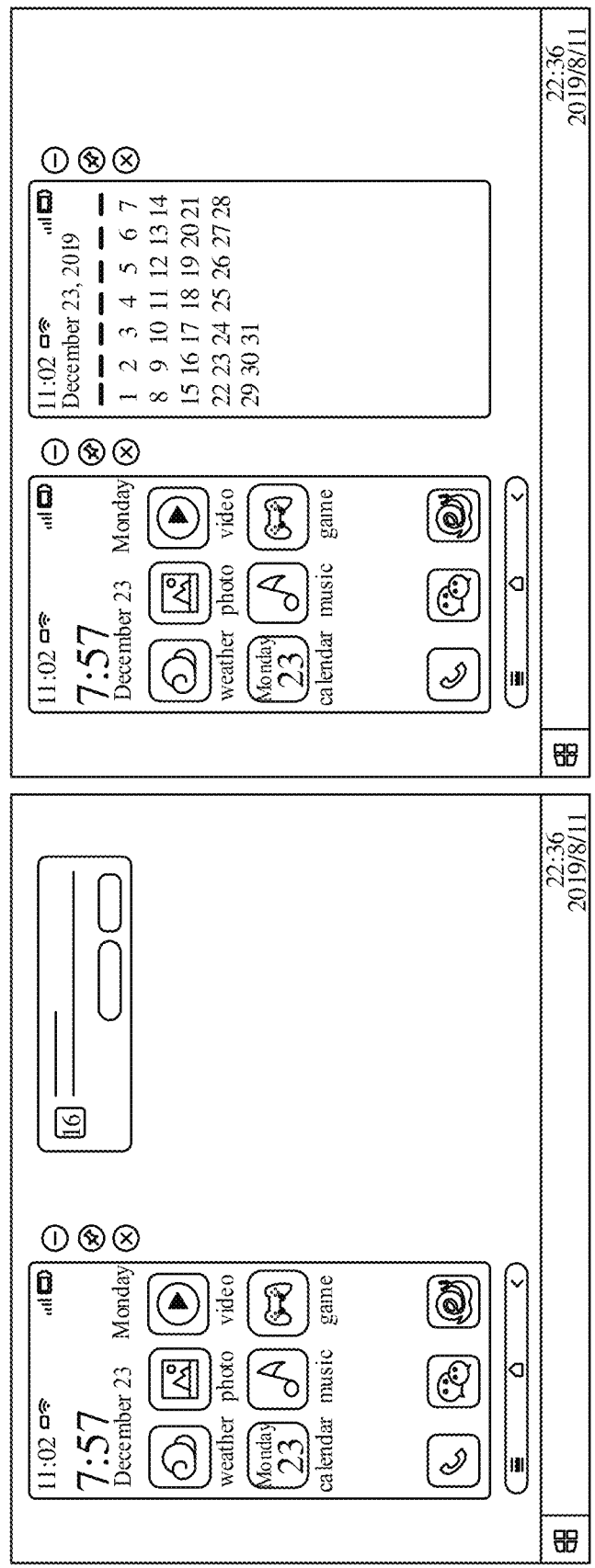
FIG. 13 is an eighth example diagram of a screen projection application according to some embodiments of the present disclosure.

FIG. 13 is an eighth example diagram of a screen projection application according to some embodiments of the present disclosure. As shown in FIG. 13, the first interface displayed on the display screen of the notebook computer may be a message prompt interface in the mobile phone, and there may be a "new window open" control on the message prompt interface, which is a message display control. When the notebook computer detects the click operation on the message display control, the message display interface of the mobile phone may be displayed in the second terminal.

It can be understood that in these embodiments, the first terminal may also project a message prompt interface when the second terminal receives the message. Based on the operation in the first terminal, a user may project the message display interface of the second terminal on the first terminal. There is no need for the user to operate on the second terminal when the second terminal receives a message while paying more attention to the first terminal, which improves the user experience.

Figure 14:
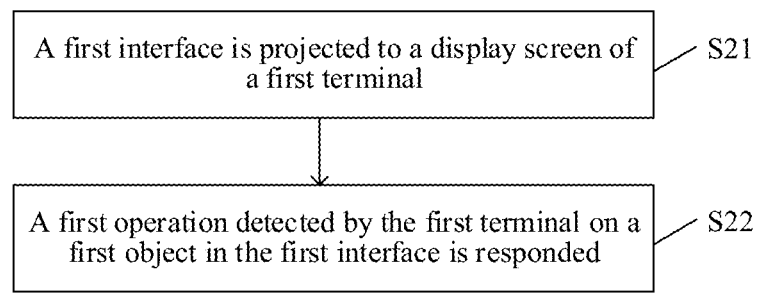
FIG. 14 is a second flowchart showing a multi-screen interaction method according to some embodiments of the present disclosure.

FIG. 14 is a second flowchart showing a multi-screen interaction method according to some embodiments of the present disclosure. As shown in FIG. 14, a multi-screen interaction method applied to a second terminal includes the following operations.

In S21, a first interface is projected to a display screen of a first terminal.

In S22, a first operation detected by the first terminal on a first object in the first interface is responded.

In these embodiments of the present disclosure, the second terminal may be a smart phone or other smart devices with a display screen, such as a smart speaker.

As described in the first terminal section, the second terminal may be connected to the first terminal in various ways. Moreover, after the first connection, the second terminal and the first terminal may also be automatically connected based on user account information to improve the user experience.

Based on the connection established with the first terminal, the second terminal may project the first interface to the first terminal based on operation S21. The first interface may be a desktop, a setting interface, or an application interface of an application presently being displayed, which is not limited in these embodiments of the present disclosure.

Based on the projected first interface, the second terminal may respond to the first operation on the first object in the first interface detected by the first terminal in operation S22.

It can be understood that in these embodiments, the second terminal can not only actively share its own first interface, but also respond to the first operation detected by the first terminal on the first object in the first interface. Through cooperation between the second terminal and the first terminal, the multi-screen interaction is more interactive.

In some embodiments, the operation to which a first operation detected by the first terminal for a first object in the first interface is responded may include that:

in response to the first operation being detected by the first terminal to drag the first object in the first interface out of the first interface, the first object is sent to the first terminal.

In these embodiments of the present disclosure, when the first operation is dragging the first object in the first interface out of the first interface, the second terminal may send the first object to the first terminal, so that the first terminal can store the first object locally.

It can be understood that in these embodiments, the first object may be sent to the first terminal based on the first operation of the second terminal responding to the drag, and the function of transmitting files from the second terminal to the first terminal is realized.

In some embodiments, the method may further include that:

a second object sent by the first terminal is received, the second object being sent after the first terminal detects a second operation of dragging a second object outside the first interface into the first interface; and the second object is saved.

In these embodiments of the present disclosure, the second object may also be displayed on the display screen of the first terminal. For example, the second object may be a document file on the desktop of the first terminal, or may be a picture file in an image list interface. When the first terminal detects that the second object is dragged into the first interface, the first terminal may send the second object to the second terminal, and the second terminal may store the second object based on the received second object.

It can be understood that in these embodiments, the second terminal can not only send out an object, but also receive the second object from the first terminal, thereby realizing the function of receiving a file by the second terminal.

In some embodiments, the first object may be a file. Operation S22 may include that:

an edited file sent by the first terminal is received, the file being a file stored in the second terminal and opened in the first terminal; and the edited file is saved.

In these embodiments, the first terminal may use a tool in the first terminal to open the file and perform the editing operation. After finishing editing the file, the first terminal may automatically send the edited file to the second terminal. The file may come from the second terminal, for example, a picture file projected by the second terminal on the picture list interface of the first terminal.

It can be understood that in these embodiments, after the first terminal edits the file from the second terminal, the second terminal may receive and save the edited file sent by the first terminal, the file editing operation becomes more convenient due to good hardware processing capability of the first terminal. Based on the automatic transmission of the first terminal, the convenience of file return is improved.

In some embodiments, the first object may be an interface added control. The operation to which a first operation detected by the first terminal for a first object in the first interface is responded may include that:

in response to the first operation being detected by the first terminal to act on the interface added control, a second interface is projected to the display screen of the first terminal.

In these embodiments, the first interface may further include an interface control. The interface control may include an interface added control, and may further include an interface close control and the like. The interface control may be hidden from the display screen of the first terminal, and displayed on the display screen based on the user's operation detected by the first terminal. For example, when the first terminal detects a sliding operation of a mouse near a first interface region, the interface control may be displayed. Further, when the first operation is a first operation detected by the first terminal and acting on the interface added control, the second terminal may project a second interface to the display screen of the first terminal. It is to be noted that the second interface may also be any interface of the second terminal, for example, a desktop of the second terminal, a Hiboard desktop, or a setting interface.

It can be understood that in these embodiments, when the first operation is the first operation detected by the first terminal and acting on the interface added control, the second terminal may continuously project the second interface, so that the first terminal may receive multiple shared tasks from the second terminal, which further provides convenience for the first terminal to operate multiple tasks in the second terminal.

In some embodiments, the second interface may include a desktop of the second terminal. The method may further include that:

in response to the first operation being a third operation detected by the first terminal for dragging an icon of a target application on the desktop out of the desktop, a third interface of the target application is projected to the display screen of the first terminal.

In these embodiments, the second interface may be a desktop of the second terminal. When the first operation is a third operation detected by the first terminal for dragging an icon of a target application on the desktop to a region outside the desktop, the second terminal may project a third interface of the target application on the display screen of the first terminal. For example, when the target application is a WeChat application, the third interface may be a chat interface of a WeChat application. For another example, when the target application is a video application, the third interface may be a home page of the video application.

It can be understood that in these embodiments, when a user needs to open a new application during a screen projection process, there is no need to open a target application in the second terminal and then project the interface to the first terminal, but the second terminal may open an application in the first terminal according to an icon dragging operation detected by the first terminal. It has the characteristics of intelligence.

In some embodiments, the method may further include that:

a first object copying instruction or a third object copying instruction is received; the first object copying instruction may be sent after the first terminal detects the first operation of dragging a first object from the first interface to the third interface, and the third object copying instruction may be sent after the first terminal detects a fourth operation of dragging a third object from the third interface to the first interface;

the first object in the first interface is copied to the third interface according to the first object copying instruction; or, the third object in the third interface is copied to the first interface according to the third object copying instruction.

In these embodiments, different interfaces may interact based on an interaction operation detected by the first terminal. When the first terminal detects the first operation of dragging the first object from the first interface to the third interface, the second terminal may receive a first object copying instruction from the first terminal, and copy the first object from the first interface to the third interface according to the first object copying instruction. Similarly, the second terminal may also copy the third object from the third interface to the first interface according to a received third object copying instruction.

It can be understood that in these embodiments, the second terminal may control the information interaction between different interfaces according to the copying instruction of the first terminal, so that the screen projection application of the first terminal is more intelligent, a user does not need to operate on the second terminal when there is an information copying requirement while paying more attention to the first terminal.

In some embodiments, the first interface may include a message prompt interface, and the interface added control may include a message display control.

The operation of projecting, in response to the first operation being detected by the first terminal to act on the interface added control, a second interface to the display screen of the first terminal may include that:

in response to the first operation being detected by the first terminal to act on the interface display control in the message prompt interface, a message display interface is projected to the display screen of the first terminal.

In these embodiments, the first interface projected on the first terminal may be a message prompt interface of the second terminal, and there may be a message display control on the message prompt interface. When the first operation is a first operation detected by the first terminal and acting on the message display control, the second terminal may project a message display interface to the display screen of the first terminal.

It can be understood that in these embodiments, it is not necessary for a user who is paying more attention to the first terminal to operate on the second terminal when the second terminal receives a message on the premise. The second terminal can directly project the message display interface to the display screen of the first terminal in response to the operation of the first terminal, which improves the user experience.

In some embodiments, the screen projection method applied to a second terminal may further include that:

a screen projection control interface is displayed;

a fifth operation acting on the screen projection control interface is detected; and in response to the fifth operation on a fourth object in the screen projection control interface being detected, the fifth operation is responded.

In these embodiments, after the second terminal may establish a connection with the first terminal, a screen projection control interface may be displayed on the display screen of the first terminal. The screen projection control interface may include multiple fourth objects, for example, multiple controls, which may enable a user to implement different functions based on the fifth operation on different controls.

Figure 15:
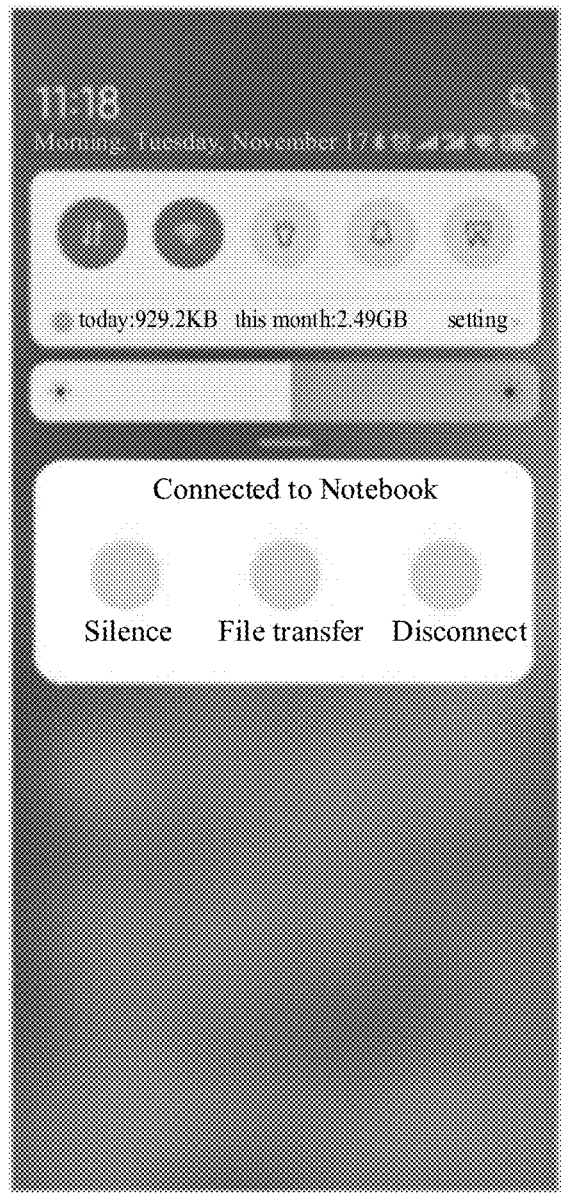
FIG. 15 is a ninth example diagram of a screen projection application according to some embodiments of the present disclosure.

FIG. 15 is a ninth example diagram of a screen projection application according to some embodiments of the present disclosure. As shown in FIG. 15, a screen projection control interface may be displayed on the display screen of the mobile phone. The screen projection control interface may include a control capable of controlling file transmission, a control capable of controlling disconnection of screen projection, and a control capable of controlling silence of a mobile phone.

It can be understood that in these embodiments, when the second terminal performs a screen projection application, a screen projection control interface may be displayed on the display screen of the second terminal, and user operations on a fourth object on the screen projection control interface may be received, so as to meet the control requirements of customers on the screen projection application. For example, targeted control operations may be performed to respond to different application requirements, so that the user experience can be improved. In addition, the first terminal may only display the screen projection control interface during the screen projection process. For example, when the first object is opened in the first terminal, a file or an application program may be opened, the first object may not need to be opened in the second terminal synchronously, thereby saving the power consumption of the second terminal.

In some embodiments, the fourth object may include a silence setting control. The operation of responding to the fifth operation when the fifth operation on a fourth object in the screen projection control interface is detected may include that:

in response to the fifth operation on the silence setting control being detected, the second terminal is set as a silent mode.

In these embodiments, the fourth object may be a silence setting control on the screen projection control interface. As shown in FIG. 15, a control displaying "mobile phone silence" is the silence setting control. When the second terminal detects a fifth operation on the control, for example, a click operation, the second terminal may be set as a silent mode. In the silent mode, when the second terminal has a notification for example, there may be no ring and/or vibration to remind the user.

As mentioned above, a message prompt interface may be displayed in the first terminal, and a message display interface may also be opened based on the first operation of the user. It can be understood that in these embodiments, when the second terminal receives the fifth operation of a user on the silence setting control, the second terminal may be set as the silent mode, so that the user can concentrate on the first terminal, and when there is, for example, a notification message, the notification message may be viewed directly on the first terminal, which provides convenience to the user.

Figure 16:
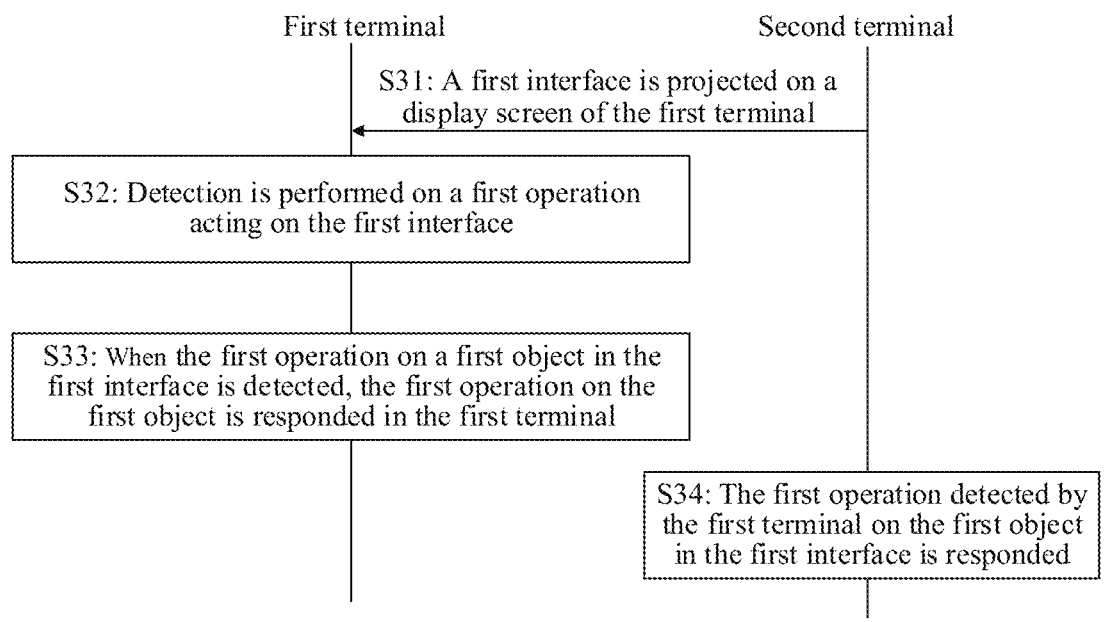
FIG. 16 is an interaction flowchart of a multi-screen interaction method performed by a multi-screen interaction system according to some embodiments of the present disclosure.

FIG. 16 is an interaction flowchart of a multi-screen interaction method performed by a multi-screen interaction system according to some embodiments of the present disclosure. The multi-screen interaction system includes a first terminal and a second terminal. As shown in FIG. 16, the multi-screen interaction method applied to the first terminal and the second terminal includes the following operations.

In S31, the second terminal projects a first interface on a display screen of the first terminal.

In S32, the first terminal detects a first operation acting on the first interface.

In S33, when the first terminal detects the first operation on a first object in the first interface, the first operation on the first object is responded in the first terminal.

In S34, the second terminal responds to the first operation detected by the first terminal on a first object in the first interface.

It can be understood that in these embodiments of the present disclosure, a first terminal can receive the sharing of a second terminal, and the second terminal can be controlled directly by an operation detected by the first terminal on a first interface displayed by the first terminal. An interactive user operation between the first terminal and the second terminal is simplified, and it is favorable for selecting the first terminal and/or the second terminal which are/is more suitable for a present application scenario based on an operation input by a user to perform corresponding operations, thereby upgrading the user experience and making multi-screen interaction more intelligent.

Figure 17:
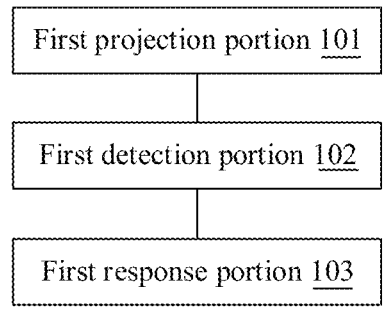
FIG. 17 is a first diagram illustrating a multi-screen interaction apparatus according to some embodiments of the present disclosure.

FIG. 17 is a first diagram illustrating a multi-screen interaction apparatus according to some embodiments of the present disclosure. Referring to FIG. 17, the multi-screen interaction apparatus is applied to a first terminal, and includes:

a first projection portion 101, configured to project a first interface of a second terminal on a display screen of the first terminal;

a first detection portion 102, configured to detect a first operation acting on the first interface; and a first response portion 103, configured to respond to, in response to the first operation on a first object in the first interface being detected, the first operation on the first object in the first terminal.

In some embodiments, the first response portion 103 is specifically configured to store, in response to the first operation of dragging the first object in the first interface out of the first interface being detected, the first object in the first terminal.

In some embodiments, the display screen may further include one or more second objects displayed outside the first interface.

The apparatus may further include:

a second detection portion, configured to detect a second operation acting on a region outside the first interface; and a first sending portion, configured to send, in response to the second operation of dragging the second object into the first interface being detected, the second object to the second terminal.

In some embodiments, the first object may be a file or a program.

The first response portion 103 may be specifically configured to open, in response to the first operation of opening the first object in the first interface being detected, the first object in the first terminal.

In some embodiments, the first object may be a file.

The first response portion 103 may be specifically configured to, in response to the first operation of editing the file being detected, open and edit the file in the first terminal, and send the edited file to the second terminal.

In some embodiments, the first object may be a link address.

The first response portion 103 may be specifically configured to open, in response to the first operation acting on the link address in the first interface being detected, a page connected to the link address according to the link address by the first terminal.

In some embodiments, the first object may include an interface added control.

The first response portion 103 may be specifically configured to project, in response to the first operation acting on the interface added control being detected, a second interface of the second terminal on the display screen of the first terminal.

In some embodiments, the second interface may include a desktop of the second terminal. The apparatus may further include:

a second projection portion, configured to project, in response to a third operation of dragging an icon of a target application on the desktop out of the desktop being detected, a third interface of the target application on the display screen of the first terminal.

In some embodiments, the apparatus may further include:

a second sending portion, configured to: send, in response to the first operation of dragging the first object from the first interface to the third interface being detected, a first object copying instruction to the second terminal, the first object copying instruction being configured to instruct the second terminal to copy the first object from the first interface to the third interface; and send, in response to a fourth operation of dragging a third object from the third interface to the first interface being detected, a third object copying instruction to the second terminal, the third object copying instruction being configured to instruct the second terminal to copy the third object from the third interface to the first interface.

In some embodiments, the first interface may include a message prompt interface, and the interface added control may include a message display control.

The second projection portion may be specifically configured to project, in response to the first operation acting on the message display control in the message prompt interface being detected, a message display interface of the second terminal on the display screen of the first terminal.

Figure 18:
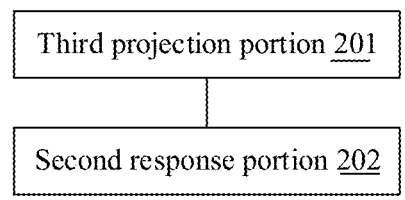
FIG. 18 is a second diagram illustrating a multi-screen interaction apparatus according to some embodiments of the present disclosure.

FIG. 18 is a second diagram illustrating a multi-screen interaction apparatus according to some embodiments of the present disclosure. Referring to FIG. 18, the multi-screen interaction apparatus is applied to a second terminal, and includes:

a third projection portion 201, configured to project a first interface to a display screen of a first terminal; and a second response portion 202, configured to respond to a first operation detected by the first terminal on a first object in the first interface.

In some embodiments, the second response portion 202 may be specifically configured to send, in response to the first operation being detected by the first terminal to drag the first object in the first interface out of the first interface, the first object to the first terminal.

In some embodiments, the apparatus may further include:

a first receiving portion, configured to receive a second object from the first terminal, the second object being sent after the first terminal detects a second operation of dragging the second object outside the first interface into the first interface; and a first saving portion, configured to save the second object.

In some embodiments, the first object may be a file, and the second response portion 202 may be specifically configured to: receive an edited file from the first terminal, the file being stored in the second terminal and opened in the first terminal; and save the edited file.

In some embodiments, the first object may be an interface added control. The second response portion 202 may be configured to project, in response to the first operation being detected by the first terminal to act on the interface added control, a second interface to the display screen of the first terminal.

In some embodiments, the second interface may include a desktop of the second terminal. The apparatus may further include:

a fourth projection portion, configured to project, in response to the first operation being a third operation detected by the first terminal for dragging an icon of a target application on the desktop out of the desktop, a third interface of the target application to the display screen of the first terminal.

In some embodiments, the apparatus may further include:

a second receiving portion, configured to receive a first object copying instruction or a third object copying instruction; the first object copying instruction may be sent after the first terminal detects the first operation of dragging the first object from the first interface to the third interface, and the third object copying instruction may be sent after the first terminal detects a fourth operation of dragging a third object from the third interface to the first interface; and a copying portion, configured to copy, according to the first object copying instruction, the first object from the first interface to the third interface; or, copy, according to the third object copying instruction, the third object from the third interface to the first interface.

In some embodiments, the first interface may include a message prompt interface, and the interface added control may include a message display control.

The fourth projection portion may be specifically configured to project, in response to the first operation being detected by the first terminal to act on the interface display control in the message prompt interface, a message display interface to the display screen of the first terminal.

In some embodiments, the apparatus may further include:
a display portion, configured to display a screen projection control interface;
a second detection portion, configured to detect a fifth operation acting on the screen projection control interface; and
a third response portion, configured to respond to, in response to the fifth operation on a fourth object in the screen projection control interface being detected, the fifth operation.

In some embodiments, the fourth object may include a silence setting control.

The third response portion may be specifically configured to set, in response to the fifth operation on the silence setting control being detected, the second terminal as a silent mode.

With regard to the apparatus in the above embodiments, the specific manner in which the respective portions perform the operations has been described in detail in these embodiments relating to the method, and will not be explained in detail herein.

Figure 19:
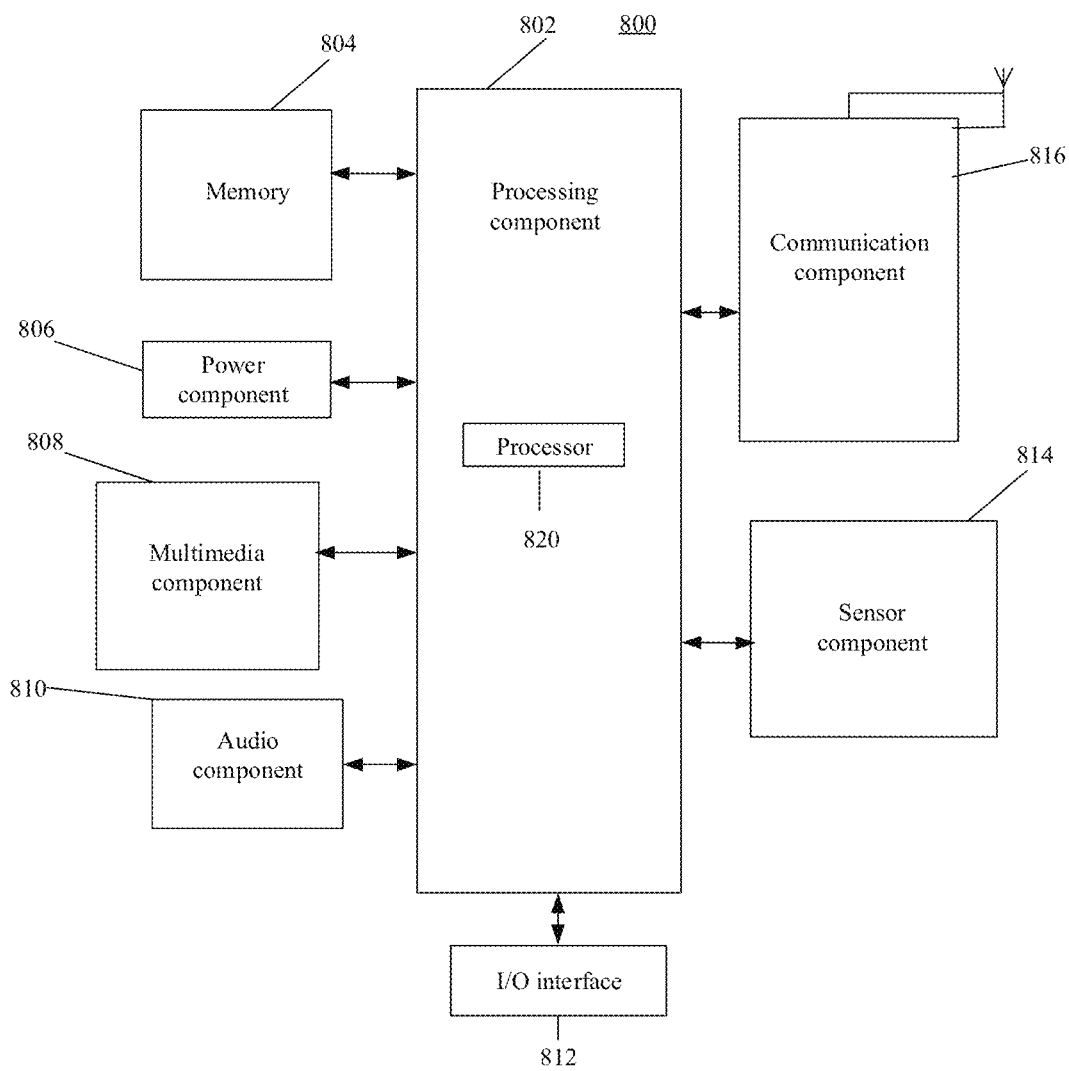
FIG. 19 is a block diagram illustrating a first terminal or a second terminal according to some embodiments of the present disclosure.

FIG. 19 is a block diagram of an apparatus 800 according to some embodiments of the present disclosure. For example, the apparatus 800 may be a first terminal and may also be a second terminal. For example, the first terminal is a computer, and the second terminal is a mobile phone.

Referring to FIG. 19, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 is configured to provide power to various components of the apparatus 800. The power component 806 may include a power management system, one or more power sources, and any other components associated with the generation, management, and distribution of power in the apparatus 800.

The multimedia component 808 may include a screen providing an output interface between the apparatus 800 and the user. In some embodiments, the screen may include a liquid crystal display (LCD) and a touch panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 may further include a speaker to output audio signals.

The I/O interface 812 is configured to provide an interface between the processing component 802 and peripheral interface modules, such as a keyboard, a click wheel, buttons, and the like. The buttons may include, but are not limited to, a home button, a volume button, a starting button, and a locking button.

The sensor component 814 may include one or more sensors to provide status assessments of various aspects of the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate communication, wired or wirelessly, between the apparatus 800 and other devices. The apparatus 800 may access a wireless network based on a communication standard, such as Wi-Fi, 2G, 3G, 4G, 5G or a combination thereof. In some embodiments, the communication component 816 receives a broadcast signal or broadcast associated information from an external broadcast management system via a broadcast channel. In some embodiments, the communication component 816 may further include an NFC module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there are also provided a non-transitory computer readable storage medium including instructions, such as included in the memory 804, executable by the processor 820 in the apparatus 800, for performing the above-described methods. For example, the non-transitory computer-readable storage medium may be a ROM, a CD-ROM, a magnetic tape, a floppy disc, an optical data storage device, and the like.

A non-transitory computer-readable storage medium is provided. When instructions in the storage medium are executed by a processor of a first terminal, the first terminal can be caused to perform a control method. The method includes that:

a first interface of a second terminal is projected on a display screen of the first terminal;

detection is performed on a first operation acting on the first interface; and in response to the first operation on a first object in the first interface being detected, the first operation on the first object is responded in the first terminal.

A non-transitory computer-readable storage medium is provided. When instructions in the storage medium are executed by a processor of a second terminal, the second terminal can be caused to perform a control method. The method includes that:

a first interface is projected to a display screen of a first terminal; and a first operation detected by the first terminal on a first object in the first interface is responded.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for multi-screen interaction, implemented by a first terminal, the method comprising:
   receiving a projection of a first interface of a second terminal on a display screen of the first terminal;
   appending an interface added control adjacent to the first interface;
   in response to a first operation on the interface added control of the first interface being detected,
   receiving a projection of a second interface of the second terminal on the display screen of the first terminal,
   wherein the second interface comprises a desktop of the second terminal,
   wherein the method further comprises:
      detecting a second operation on a second object on the desktop of the second interface, wherein the second operation comprises dragging the second object from the second interface to a desktop of the first terminal;
      based on both the detecting the second operation and determining that the second object is an icon of an application program, receiving, from the second terminal, a projection of a third interface of the application program on the display screen of the first terminal;
      concurrently displaying the received projections of the first, second, and third interfaces on the display screen of the first terminal;
      detecting a third operation on a third object in the first interface, wherein the third operation comprises dragging the third object from the first interface to the desktop of the first terminal; and
      based on both the detecting the third operation and determining that the third object is a file, receiving the file by the first terminal from the second terminal, and storing the file at the first terminal.

2. The method according to claim 1, further comprising:
   detecting an operation on a link address in the first interface; and
   opening a page connected to the link address according to the link address.

3. A device set implementing the method according to claim 1, comprising a plurality of terminals including the first terminal and the second terminal, wherein the first terminal and the second terminal include a mobile phone and a computer, and wherein:
   the first terminal is configured to:
      receive content shared by the second terminal; and
      control the second terminal, thereby simplifying an interactive user operation between the first terminal and the second terminal, and facilitating selecting the first terminal and/or the second terminal based on an operation input by a user to perform corresponding operations;
   the second terminal is configured to:
      project the first interface to a display screen of the first terminal; and
      respond to the first operation detected by the first terminal on the first object in the first interface.

4. The device set according to claim 3, wherein:
   the first terminal is configured to:
      open the content in the second terminal, and use tools of the first terminal to edit the content; and
      automatically send the edited content without a dragging operation;
   the first terminal is a computer, and the second terminal is a mobile phone, wherein the shared content is displayed on a display screen of the computer that is larger than a display screen of the mobile phone, thereby improving user visual experience; and
   the computer is configured to respond to the first operation, thereby utilizing hardware processing of the computer that is faster than that of the mobile phone.

5. The device set of claim 3, wherein
the first interface of the second terminal comprises a message prompt interface, and the interface added control in the first interface comprises a message display control;
a screen projection control interface is displayed on the second terminal and comprises a silence setting control configured to set the second terminal as a silent mode;
when the second terminal is in the silent mode, the second terminal is configured to, in response to the first operation acting on the message display control in the message prompt interface being detected, project a message display interface of the second terminal to the display screen of the first terminal, without making any ringing or vibration to remind a user of a message received at the second terminal; and
the first terminal is configured to receive the message display interface of the second terminal and display the message on the display screen of the first terminal.

6. A method for multi-screen interaction, implemented by a second terminal, the method comprising:
projecting a first interface to a display screen of a first terminal; and
in response to a first operation being detected by the first terminal to act on an interface added control appended adjacent to the first interface, projecting a second interface of the second terminal to the display screen of the first terminal,
wherein the second interface comprises a desktop of the second terminal, and
wherein the method further comprises:
receiving, at the second terminal, a detection of a second operation on a second object on the desktop of the second interface, wherein the second operation comprises dragging the second object from the second interface to a desktop of the first terminal;
in response to both the detecting the second operation and determining that the second object is an icon of an application program, sending, from the second terminal, a projection of a third interface of the application program to the display screen of the first terminal;
concurrently displaying, at the first terminal, the received projections of the first, second, and third interfaces on the display screen of the first terminal;
receiving, at the second terminal, a detection of a third operation on a third object in the first interface, wherein the third operation comprises dragging the third object from the first interface to the desktop of the first terminal; and
in response to both the detecting the third operation and determining that the third object is a file, sending the third object by the second terminal to the first terminal.

7. The method according to claim 6, further comprising:
receiving an object from the first terminal, wherein the object is sent after the first terminal detects an operation of dragging the object outside the first interface into the first interface; and
saving the object.

8. The method according to claim 6, further comprising:
detecting an operation on a file in the first interface;
receiving an edited file from the first terminal, the edited file being a file stored in the second terminal and opened in the first terminal; and
saving the edited file.

9. An apparatus for multi-screen interaction, implemented by a first terminal, the apparatus comprising:
a processor; and
memory configured to store instructions executable by the processor,
wherein the processor is configured to:
receive a projection of a first interface of a second terminal on a display screen of the first terminal;
append an interface added control adjacent to the first interface; and
in response to a first operation acting on the interface added control of the first interface being detected, receive a projection of a second interface of the second terminal on the display screen of the first terminal,
wherein the second interface comprises a desktop of the second terminal,
wherein the processor is further configured to:
detect a second operation on a second object on the desktop of the second interface, wherein the second operation comprises dragging the second object from the second interface to a desktop of the first terminal;
based on both the detecting the second operation and determining that the second object is an icon of an application program, receive, from the second terminal, a projection of a third interface of the application program on the display screen of the first terminal;
concurrently display the received projections of the first, second, and third interfaces on the display screen of the first terminal;
detect a third operation on a third object in the first interface, wherein the third operation comprises dragging the third object from the first interface to the desktop of the first terminal; and
based on both the detecting the third operation and determining that the third object is a file, receive the file from the second terminal, and store the file at the first terminal.

10. The apparatus according to claim 9, wherein the first interface comprises a message prompt interface, and the interface added control comprises a message display control; and
the processor is further configured to, in response to the first operation acting on the message display control in the message prompt interface being detected, receive a projection of a message display interface of the second terminal on the display screen of the first terminal.

11. An apparatus for multi-screen interaction, implemented by a second terminal, the apparatus comprising:
a processor; and
memory configured to store instructions executable by the processor,
wherein the processor is configured to:
project a first interface to a display screen of a first terminal; and
in response to a first operation being detected by the first terminal to act on an interface added control appended adjacent to the first interface, project a second interface of the second terminal to the display screen of the first terminal,
wherein the second interface comprises a desktop of the second terminal,
wherein the processor is further configured to:
receive a detection of a second operation on a second object on the desktop of the second interface, wherein the second operation comprises dragging the second object from the second interface to a desktop of the first terminal;

in response to both the detection of the second operation and a determination that the second object is an icon of an application program, sending, from the second terminal, a projection of a third interface of the application program to the display screen of the first terminal;

send a projection of a third interface of the application program to the display screen of the first terminal, wherein the projections of the first, second, and third interfaces are concurrently displayed on the display screen of the first terminal; and receive a detection of a third operation on a third object in the first interface, wherein the third operation comprises dragging the third object from the first interface to the desktop of the first terminal; and in response to both the detection of the third operation and a determination that the third object is a file, sending the third object by the second terminal to the first terminal.

12. The apparatus according to claim 11, wherein the first interface comprises a message prompt interface, and the interface added control comprises a message display control; and the processor is further configured to, in response to the first operation being detected by the first terminal to act on the interface display control in the message prompt interface, project a message display interface to the display screen of the first terminal.

13. The apparatus according to claim 11, wherein the processor is further configured to:

display a screen projection control interface;

detect a fifth operation acting on the screen projection control interface; and respond to the fifth operation in response to that the fifth operation on a fourth object in the screen projection control interface being detected.

14. The apparatus according to claim 13, wherein the fourth object comprises a silence setting control; and the processor is further configured to set the second terminal as a silent mode, in response to the fifth operation on the silence setting control being detected.

* * * * *